US012272278B2

(12) United States Patent
Hsieh et al.

(10) Patent No.: US 12,272,278 B2
(45) Date of Patent: Apr. 8, 2025

(54) HEAD-MOUNTED DISPLAY AND METHOD FOR IMAGE PROCESSING BASED ON DIOPTER ADJUSTMENT

(71) Applicant: HTC Corporation, Taoyuan (TW)

(72) Inventors: Cheng Hsin Hsieh, Taoyuan (TW); Yan-Min Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/614,712

(22) Filed: Mar. 24, 2024

(65) Prior Publication Data

US 2024/0355238 A1 Oct. 24, 2024

Related U.S. Application Data

(60) Provisional application No. 63/460,606, filed on Apr. 20, 2023.

(51) Int. Cl.
*G09G 3/00* (2006.01)

(52) U.S. Cl.
CPC ..... *G09G 3/001* (2013.01); *G09G 2320/0606* (2013.01); *G09G 2340/045* (2013.01); *G09G 2354/00* (2013.01)

(58) Field of Classification Search
CPC ..... G09G 2320/0606; G09G 2340/045; G09G 2354/00; G09G 3/001
See application file for complete search history.

(56) References Cited

U.S. PATENT DOCUMENTS

2014/0285429 A1* 9/2014 Simmons ........... G02B 27/0179 359/259
2021/0235067 A1* 7/2021 Valli .................... H04N 13/395
2024/0036306 A1* 2/2024 Jin .......................... G06F 3/013

* cited by examiner

*Primary Examiner* — Van N Chow
(74) *Attorney, Agent, or Firm* — JCIPRNET

(57) ABSTRACT

A head-mounted display and a method for image processing based on diopter adjustment are provided. The method includes: receiving a command corresponding to a first diopter setting; in response to the command, rendering an image according to a mapping table to generate a rendered image; and displaying the rendered image.

12 Claims, 4 Drawing Sheets

HEAD-MOUNTED DISPLAY AND METHOD FOR IMAGE PROCESSING BASED ON DIOPTER ADJUSTMENT

CROSS-REFERENCE TO RELATED APPLICATION

This application claims the priority benefit of U.S. provisional application Ser. No. 63/460,606, filed on Apr. 20, 2023. The entirety of the above-mentioned patent application is hereby incorporated by reference herein and made a part of this specification.

BACKGROUND

Technical Field

The disclosure is related to extended reality (XR) technology, and particularly related to a head-mounted display (HMD) and a method for image processing based on diopter adjustment.

Description of Related Art

To achieve a more lightweight and comfortable HMD, a diopter adjustment function may be incorporated into the HMD. The diopter adjustment function accommodates users with different diopter values in their unaided vision, thereby reducing internal space of the HMD needed for users wearing corrective lenses. However, after the diopter setting of the HMD has been adjusted, the image processing software for distortion correction of lenses in the HMD would no longer be suitable for the HMD.

SUMMARY

The disclosure is directed to an HMD and a method for image processing based on diopter adjustment.

The present invention is directed to a head-mounted display for image processing based on diopter adjustment. The head-mounted display includes a display, an input device for diopter adjustment, a storage medium storing a mapping table, and a processor coupled to the display, the input device, and the storage medium, wherein the processor is configured to: receive a command corresponding to a first diopter setting by the input device; in response to the command, render an image according to the mapping table to generate a rendered image; and display the rendered image by the display.

The present invention is directed to a method for image processing based on diopter adjustment, including: receiving a command corresponding to a first diopter setting; in response to the command, rendering an image according to a mapping table to generate a rendered image; and displaying the rendered image.

Based on the above description, the present invention may calibrate an HMD with diopter adjustment functionality and reduce the distortion caused by changes in the diopter setting of the HMD accordingly.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
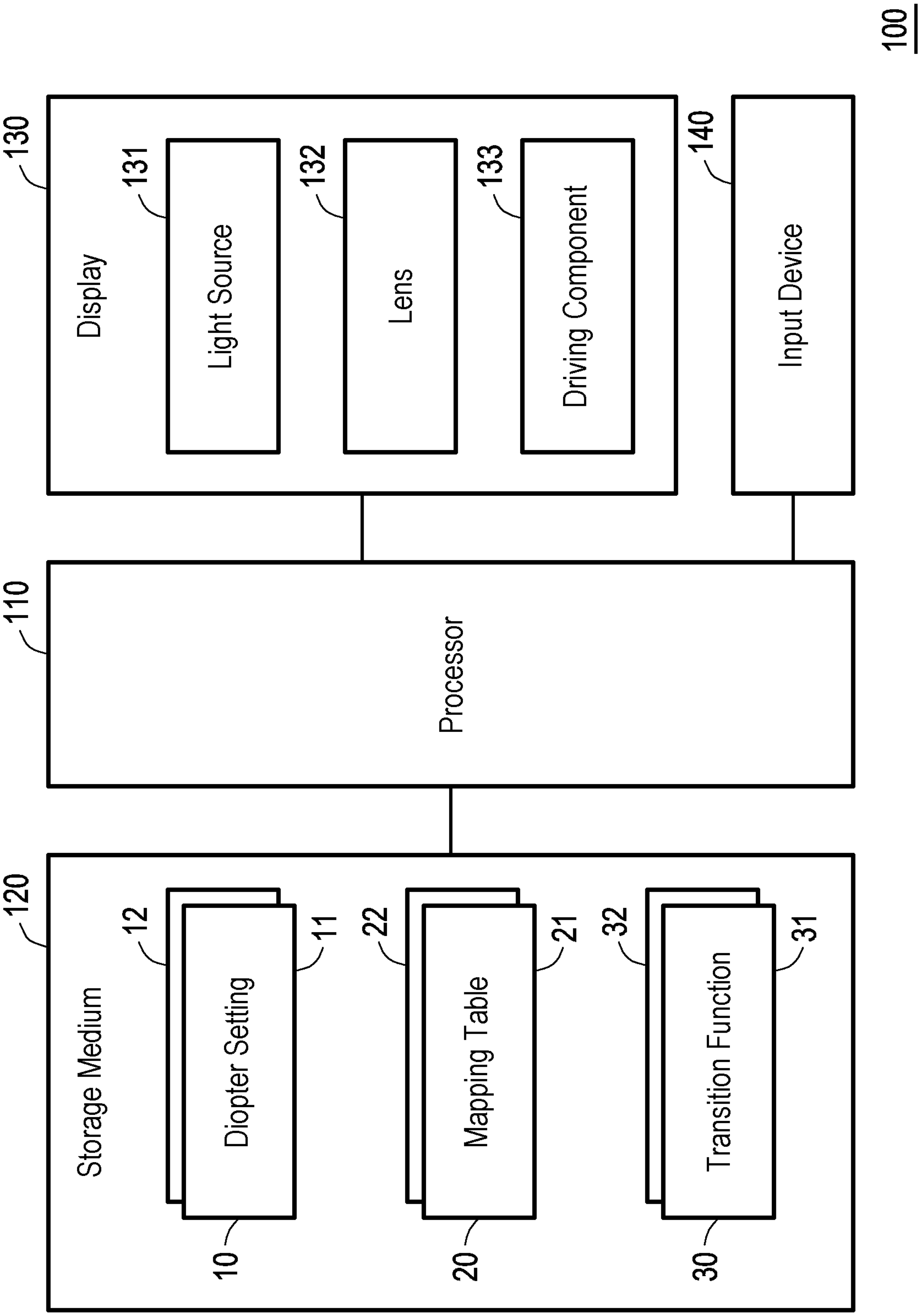
FIG. 1 illustrates a schematic diagram of an HMD according to one embodiment of the present invention.

FIG. 1 illustrates a schematic diagram of an HMD 100 according to one embodiment of the present invention. The HMD 100 may be used for providing a XR environment (or XR scene) such as a virtual reality (VR) environment, an augmented reality (AR) environment, or a mixed reality (MR) environment for the user.

The HMD 100 may include a processor 110, a storage medium 120, a display 130, and an input device 140. The processor 110 may be, for example, a central processing unit (CPU), or other programmable general purpose or special purpose micro control unit (MCU), a microprocessor, a digital signal processor (DSP), a programmable controller, an application specific integrated circuit (ASIC), a graphics unit (GPU), an arithmetic logic unit (ALU), a complex programmable logic device (CPLD), a field programmable gate array (FPGA), or other similar device or a combination of the above devices. The processor 110 may be coupled to the storage medium 120, the display 130, and the input device 140.

The storage medium 120 may be, for example, any type of fixed or removable random-access memory (RAM), a read-only memory (ROM), a flash memory, a hard disk drive (HDD), a solid-state drive (SSD) or similar element, or a combination thereof. The storage medium 120 may be a non-transitory computer readable storage medium configured to record a plurality of executable computer programs, modules, or applications to be loaded by the processor 110 to perform the functions of the HMD 100.

In one embodiment, the storage medium 120 may record one or more diopter settings 10 (e.g., diopter setting 11 or diopter setting 12), one or more mapping tables 20 (e.g., mapping table 21 or mapping table 22), or one or more transition functions 30 (e.g., transition function 31 or transition function 32).

The display 130 may be used for displaying video data or image data such as an XR scene of the XR environment for the user wearing the HMD 100. The display 130 may include a liquid-crystal display (LCD) or an organic light-emitting diode (OLED) display. The display 130 may provide an image beam to the eyes of the user to form the image on the retinal of the user such that the user may see an XR scene created by the HMD 100. In one embodiment, the display 130 may include a light source 131, lens 132, and a driving component 133. The light source 131 may provide a light passing through the lens 132 to form an image (e.g., an XR scene) for the user wearing the HMD 100. The light source 131 or the driving component 133 may be electrically connected to the processor 110 and may be controlled by the processor 110. The processor 110 may control the driving component 133 to adjust the position of the light source 131 or the position of the lens 132 such that a distance between the light source 131 and the lens 132 may be changed.

The input device 140 may be used for diopter adjustment. The user of the HMD 100 may manipulate the input device 140 so as to transmit a command to the processor 110 for diopter adjustment. For example, the input device 140 may include a physical button electrically connected to the processor 110. If the physical button is pushed by a user, the processor 110 may receive a signal from the physical button and may perform diopter adjustment for the HMD 100 according to the signal. For another example, the input device 140 may include a knob (e.g., a knob with lens 132 embedded in it) with a variable resistor electrically connected to the processor 110. If the knob is manipulated by a user, the know allows the selection of a specific resistor value within the variable resistor. Subsequently, an analog signal corresponding to the selected resistor value may be transmitted to the processor 110. The processor 110 may perform diopter adjustment for the HMD 100 according to the received analog signal.

Figure 2:
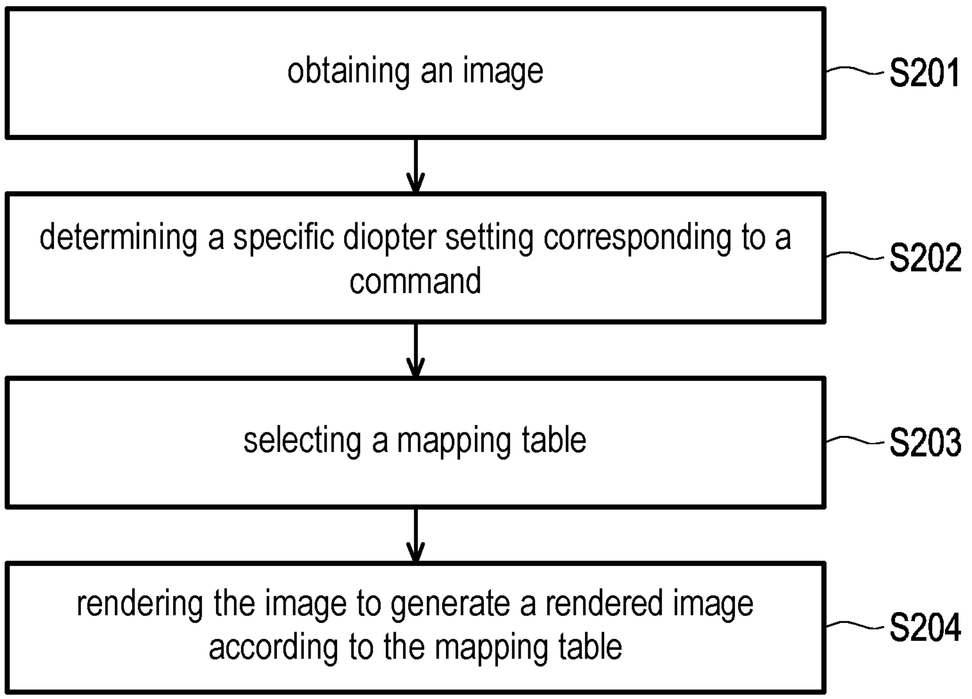
FIG. 2 illustrates a flowchart of a method for image processing based on diopter adjustment according to one embodiment of the present invention.

FIG. 2 illustrates a flowchart of a method for image processing based on diopter adjustment according to one embodiment of the present invention, wherein the method may be implemented by the HMD 100 as shown in FIG. 1.

In step S201, the processor 110 may obtain an image (also referred to as an original image), wherein the image may be displayed by the display 130 for creating a XR scene.

In step S202, the processor 110 may determine to apply a specific diopter setting. Specifically, the processor 110 may receive a command by the input device 140 and determine a specific diopter setting corresponding to the command.

In one embodiment, the processor 110 may apply the specific diopter setting. Specifically, the processor 110 may control the driving component 133 to adjust a distance between the lens 132 and the light source 131 according to the specific diopter setting, wherein the distance (e.g., the distance before the adjustment or the distance after the adjustment) between the lens 132 and the light source 131 may be less than the focal length of the lens 132.

In step S203, the processor 110 may select a mapping table from the plurality of mapping tables 20 according to the command or the specific diopter setting. For example, if the command or the specific diopter setting is corresponded to the mapping table 21, the processor 110 may select the mapping table 21 from the plurality of mapping tables 20 according to the command.

In one embodiment, the storage medium 120 may record a plurality of mapping tables 20, wherein each mapping table 20 may be corresponded to a diopter setting. The processor 110 may determine whether the command (or the specific diopter setting) matches with one of the plurality of mapping tables 20 and may select the mapping table matching with the command accordingly. For example, the processor 110 may determine that the command matches with the mapping table 21 of the plurality of mapping tables 20 and may select the mapping table 21 from the plurality of mapping tables 20 accordingly. After the mapping table 21 corresponding to the command (or the specific diopter setting) is selected, in step S204, the processor 110 may render the image according to the selected mapping table 21 to generate a rendered image. The processor 110 may display the rendered image for the user of the HMD 100 by the display 130. That is, the light source 131 may provide a light passing through the lens 132 to form the rendered image on a virtual plane or on the retinal of the user.

In one embodiment, the storage medium 120 may record one reference mapping table 20 (i.e., a mapping table corresponding to a standard diopter setting) and may record a plurality of transition functions 30, wherein each transition function 30 may be corresponded to a diopter setting, wherein the data amount of one transition function 30 may be less than the data amount of one mapping table 20. The processor 110 may determine whether the command (or the specific diopter setting) matches with one of the plurality of transition functions 30 and may select the transition function matching with the command accordingly. For example, the processor 110 may determine that the command matches with the transition function 31 of the plurality of transition functions 30 and may select the transition function 31 from the plurality of transition functions 30 accordingly. After the transition function 31 corresponding to the command (or the specific diopter setting) is selected, the processor 110 may render the image according to the reference mapping table 20 and the selected transition function 31 to generate a rendered image. For example, the processor 110 may multiply the reference mapping table 20 by the transition function 31 to obtain a mapping table suitable for the specific diopter setting and may render the original image according to the obtained mapping table to generate the rendered image. The processor 110 may display the rendered image for the user of the HMD 100 by the display 130. That is, the light source 131 may provide a light passing through the lens 132 to form the rendered image on a virtual plane or on the retinal of the user. Since only one mapping table 20 (i.e., reference mapping table 20) needs to be recorded in the storage medium 120, significant space saving can be achieved on the storage medium 120.

In one embodiment, a mapping table 20 may include a vector between a pixel of the original image and a corresponding pixel of the rendered image, wherein the vector may compensate the pincushion distortion of the original image with the barrel distortion to generate the rendered image. In one embodiment, the processor 110 may generate the one or more mapping tables 20 based on a Brown-Conrady model.

Figure 3:
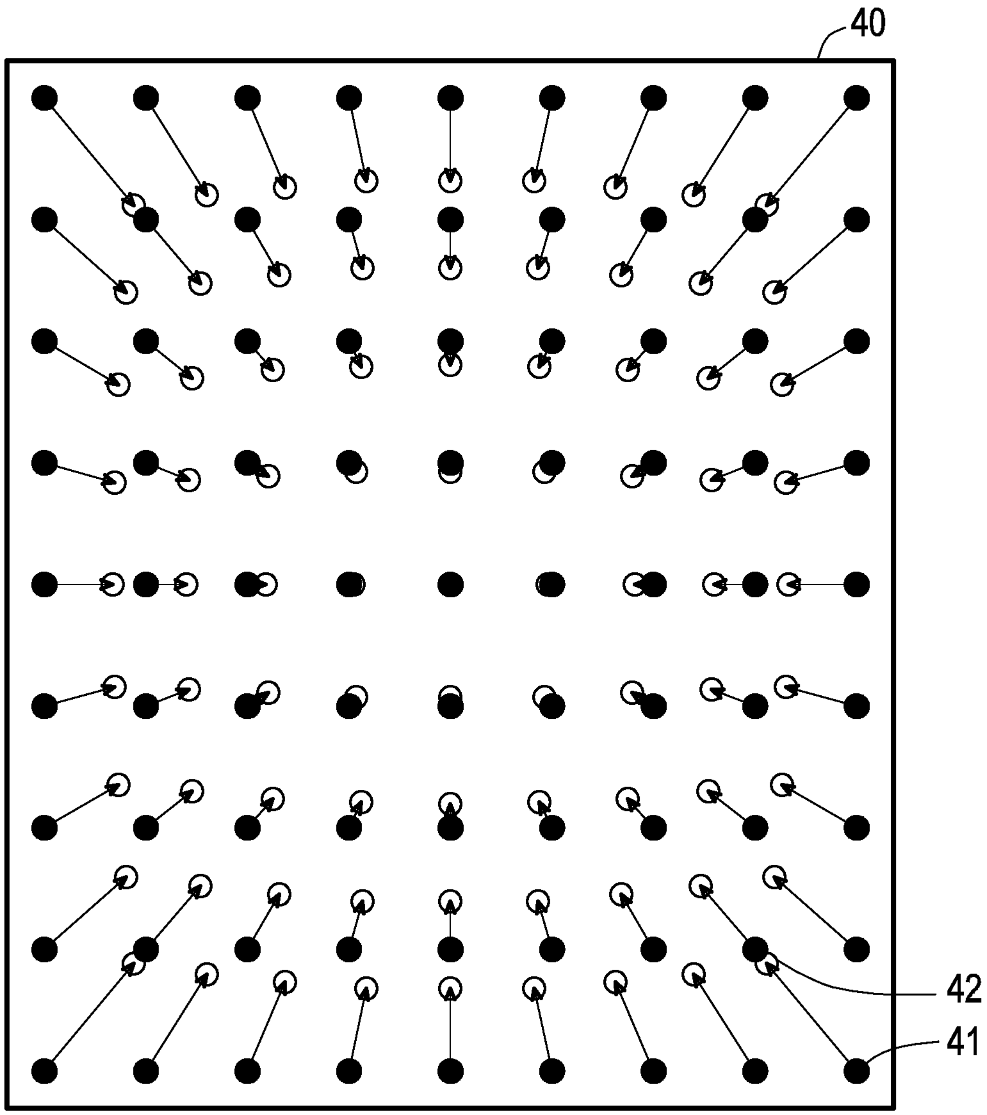
FIG. 3 illustrates a schematic diagram of distortion correction according to one embodiment of the present invention.

FIG. 3 illustrates a schematic diagram of distortion correction according to one embodiment of the present invention. Assume that the display 130 may form an image (e.g., an original image or a rendered image) on a virtual plane 40, wherein the virtual plane 40 may be, for example, the plane on the retinal of the user. The mapping table 20 may include a vector for mapping a pixel 41 from the original image to a pixel 42 from the rendered image. That is, after the original image is rendered and the rendered image is generated accordingly, a pixel from the original image may be shifted towards the center of the virtual plane 40, wherein the center of the virtual plane 40 may align with the position where the optical axis of the lens 132 passing through.

In one embodiment, a mapping table 20 may further include a scaling factor between the original image and the rendered image, wherein the scaling factor may be associated with the size of the original image and the size of the rendered image. After the sizes of the original image and the rendered image are determined by the processor 110, the processor 110 may update the vector recorded in the mapping table according to the scaling factor. The processor 110 may render the original image according to the updated vector to generate the rendered image.

Figure 4:
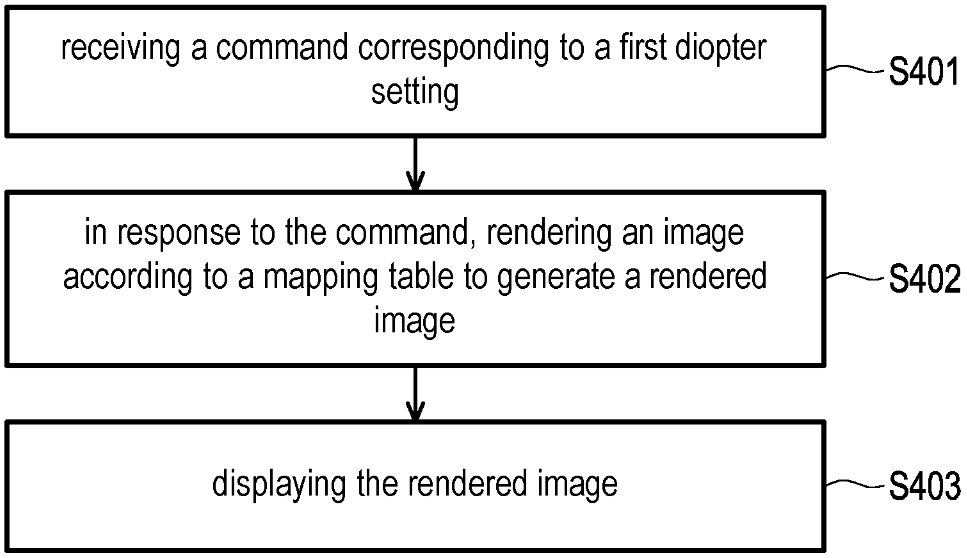
FIG. 4 illustrates a flowchart of a method for image processing based on diopter adjustment according to one embodiment of the present invention.

FIG. 4 illustrates a flowchart of a method for image processing based on diopter adjustment according to one embodiment of the present invention, wherein the method may be implemented by the HMD 100 as shown in FIG. 1.

In step S401, receiving a command corresponding to a first diopter setting. In step S402, in response to the command, rendering an image according to a mapping table to generate a rendered image. In step S403, displaying the rendered image.

In summary, the HMD of the present invention may perform diopter adjustment for users with different diopter values according to user's commands. After the diopter setting of the HMD has been changed, the HMD may render the image to be output in a manner suitable for the adjusted diopter setting, thereby correcting the distortion caused by the change in diopter setting.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A head-mounted display for image processing based on diopter adjustment, comprising:
- a display;
- an input device for diopter adjustment;
- a storage medium, storing a transition function corresponding to a first diopter setting and a mapping table corresponding to a second diopter setting, wherein data amount of one transition function is less than data amount of one mapping table; and
- a processor, coupled to the display, the input device, and the storage medium, wherein the processor is configured to:
- receive a command corresponding to the first diopter setting by the input device;
- in response to the command, render an image according to the mapping table and the transition function to generate a rendered image; and
- display the rendered image by the display.

2. The head-mounted display according to claim 1, wherein the storage medium stores a plurality of mapping tables comprising the mapping table, and the processor is further configured to:
- determine whether the command matches one of the plurality of mapping tables;
- in response to determining the command matches the mapping table, select the mapping table corresponding to the first diopter setting from the plurality of mapping tables; and
- render the image according to the selected mapping table.

3. The head-mounted display according to claim 1, wherein the display comprising:
- a lens;
- a light source; and
- a driving component, coupled to the processor, wherein the processor is configured to:
- control the driving component to adjust a distance between the lens and the light source according to the first diopter setting, wherein the light source provides a light passing through the lens to form the rendered image.

4. The head-mounted display according to claim 3, wherein the distance is less than a focal length of the lens.

5. The head-mounted display according to claim 1, wherein the mapping table comprises a vector between a first pixel of the image and a second pixel of the rendered image corresponding to the first pixel.

6. The head-mounted display according to claim 1, wherein the mapping table comprises a scaling factor between the image and the rendered image.

7. A method for image processing based on diopter adjustment, adapted to a head-mounted display, wherein the method comprises:
- receiving a command corresponding to a first diopter setting;
- in response to the command, rendering an image according to a mapping table corresponding to a second diopter setting and a transition function corresponding to a first diopter setting to generate a rendered image; and
- displaying the rendered image,
- wherein data amount of one transition function is less than data amount of one mapping table.

8. The method according to claim 7, wherein the step of rendering the image according to the mapping table corresponding to the second diopter setting and the transition function corresponding to the first diopter setting to generate the rendered image comprising:
- determining whether the command matches one of a plurality of mapping tables, wherein the plurality of mapping tables comprise the mapping table;
- in response to determining the command matches the mapping table, selecting the mapping table corresponding to the first diopter setting from the plurality of mapping tables; and
- rendering the image according to the selected mapping table.

9. The method according to claim 7, further comprising:
- controlling a driving component to adjust a distance between a lens of the head-mounted display and a light source of the head-mounted display, wherein the light source provides a light passing through the lens to form the rendered image.

10. The method according to claim 9, wherein the distance is less than a focal length of the lens.

11. The method according to claim 7, wherein the mapping table comprises a vector between a first pixel of the image and a second pixel of the rendered image corresponding to the first pixel.

12. The method according to claim 7, wherein the mapping table comprises a scaling factor between the image and the rendered image.

* * * * *